United States Patent
Takei et al.

(10) Patent No.: US 11,772,032 B2
(45) Date of Patent: Oct. 3, 2023

(54) FILTER UNIT QUALITY MANAGEMENT SYSTEM AND FILTER UNIT QUALITY MANAGEMENT METHOD

(71) Applicant: Mitsubishi Hitachi Power Systems, Ltd., Yokohama (JP)

(72) Inventors: Rei Takei, Tokyo (JP); Yoshiyuki Doi, Yokohama (JP); Hiroyuki Katayama, Yokohama (JP); Toyosei Aota, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 645 days.

(21) Appl. No.: 16/962,407

(22) PCT Filed: Jan. 31, 2019

(86) PCT No.: PCT/JP2019/003331
§ 371 (c)(1),
(2) Date: Jul. 15, 2020

(87) PCT Pub. No.: WO2019/151383
PCT Pub. Date: Aug. 8, 2019

(65) Prior Publication Data
US 2021/0069624 A1 Mar. 11, 2021

(30) Foreign Application Priority Data

Jan. 31, 2018 (JP) .................................. 2018-015372

(51) Int. Cl.
*B01D 46/00* (2022.01)
*B01D 46/42* (2006.01)
(Continued)

(52) U.S. Cl.
CPC ........... *B01D 46/56* (2022.01); *B01D 46/446* (2013.01); *B01D 46/46* (2013.01); *F02C 7/052* (2013.01);
(Continued)

(58) Field of Classification Search
CPC .. B01D 46/0086; B01D 46/46; B01D 46/446; B01D 2279/60; F02D 2260/60;
(Continued)

(56) References Cited

U.S. PATENT DOCUMENTS 3,766,715 A * 10/1973 Archer ................... G01N 27/16
73/23.31
4,786,293 A * 11/1988 Labadie ................. B01D 46/71
95/20
(Continued)

FOREIGN PATENT DOCUMENTS

| EP | 3 409 923 | 7/2020 |
| JP | 10-151942 | 6/1998 |

(Continued)

OTHER PUBLICATIONS

Office Action dated Nov. 15, 2021 in counterpart Korean Patent Application No. 10-2020-7020872, with English-language translation.
(Continued)

*Primary Examiner* — Minh Chau T Pham
(74) *Attorney, Agent, or Firm* — Wenderoth, Lind & Ponack, L.L.P.

(57) ABSTRACT

The present application relates to a system for quality management of a filter unit disposed in an intake passage. The system includes a plurality of evaluation parameter detection units configured to detect an evaluation parameter relating to of each filter constituting a filter layer of the filter unit. By determining a distribution of the evaluation param- (Continued)

eter based on the detection values, the quality evaluation is performed.

16 Claims, 11 Drawing Sheets

(51) Int. Cl.
  *B01D 46/44* (2006.01)
  *B01D 46/46* (2006.01)
  *B01D 46/56* (2022.01)
  *F02D 25/00* (2006.01)
  *F02C 7/052* (2006.01)
  *G01N 15/08* (2006.01)

(52) U.S. Cl.
  CPC ......... *G01N 15/08* (2013.01); *B01D 2279/60* (2013.01); *F05D 2260/607* (2013.01); *F05D 2270/3015* (2013.01); *F05D 2270/3061* (2013.01); *F05D 2270/331* (2013.01)

(58) Field of Classification Search
  CPC .......... F02D 2260/80; F02D 2260/607; F02D 2270/331; F02D 2270/3015; F02D 2270/3061
  USPC ........ 55/483, 484, 341.1, DIG. 34; 95/1, 19; 96/422
  See application file for complete search history.

(56) References Cited

U.S. PATENT DOCUMENTS

| | | | | |
|---|---|---|---|---|
| 4,824,450 A * | 4/1989 | Howard | ............. | B01D 46/0005 55/341.3 |
| 5,572,327 A * | 11/1996 | Plinke | ................... | G01M 3/38 96/417 |
| 6,875,256 B2 * | 4/2005 | Gillingham | .......... | B01D 46/521 55/482 |
| 8,075,674 B2 * | 12/2011 | Raether | .............. | B01D 46/2411 95/280 |
| 8,114,196 B2 * | 2/2012 | Lamee | ...................... | F02C 7/05 95/280 |
| 8,721,753 B2 * | 5/2014 | Ayshford | ........... | B01D 46/0097 55/480 |
| 8,747,533 B1 * | 6/2014 | Ekanayake | ........ | B01D 46/0086 96/417 |
| 2004/0217872 A1 | 11/2004 | Bhardwaj et al. | | |
| 2007/0039464 A1 * | 2/2007 | Vanderhoof | .............. | F24F 3/14 95/45 |
| 2009/0107337 A1 * | 4/2009 | Vu | ......................... | B01D 46/71 95/279 |
| 2011/0314776 A1 * | 12/2011 | Bloom | ................... | B01D 53/24 55/392.1 |
| 2014/0208942 A1 | 7/2014 | Scipio et al. | | |
| 2017/0002821 A1 | 1/2017 | Claussen et al. | | |
| 2017/0320004 A1 | 11/2017 | Allegorico et al. | | |

FOREIGN PATENT DOCUMENTS

| | | |
|---|---|---|
| JP | 2004-169667 | 6/2004 |
| JP | 2004-346933 | 12/2004 |
| JP | 2006-9591 | 1/2006 |
| JP | 2008-19801 | 1/2008 |
| JP | 2008-50965 | 3/2008 |
| JP | 2015-190452 | 11/2015 |
| KR | 10-2004-0060065 | 7/2004 |
| KR | 10-0682797 | 2/2007 |
| KR | 10-2015-0139664 | 12/2015 |

OTHER PUBLICATIONS

International Search Report dated Apr. 2, 2019 in International (PCT) Patent Application No. PCT/JP2019/003331, with English Translation.
International Preliminary Report on Patentability dated Aug. 13, 2020 in International (PCT) Patent Application No. PCT/JP2019/003331, with English Translation.

* cited by examiner

FILTER UNIT QUALITY MANAGEMENT SYSTEM AND FILTER UNIT QUALITY MANAGEMENT METHOD

TECHNICAL FIELD

The present disclosure relates to a filter unit quality management system and a filter unit quality management method for quality management of a filter unit for removing foreign substances contained in intake gas flowing through an intake passage.

BACKGROUND

Generally, some machines that take in gas such as air or gas through an intake passage include a filter device for removing foreign substances such as dust contained in the gas. The filter life (time until the maximum available pressure loss is reached) of the filter device gradually decreases due to the accumulation of foreign substances collected on the filter element as the machine is used. Therefore, for appropriately managing the filter life, it is necessary to monitor the filter performance and perform maintenance such as replacement of the filter element at a predetermined timing to manage the quality.

For example, patent Document 1 discloses a device and a method for monitoring the state of a filter element disposed in an intake passage of an internal combustion engine. In this document, the inlet pressure and outlet pressure of the filter element are measured, and the state of the filter element is evaluated based on the differential pressure between them.

CITATION LIST

Patent Literature

Patent Document 1: JP2004-346933A

SUMMARY

Problems to be Solved

Such machines provided with a filter device include a machine larger than an internal combustion engine as described in Patent Document 1, for example, a gas turbine. In such a large machine, an intake passage of large diameter is used with an increase in intake amount, so that the filter device disposed in the intake passage tends to increase in size.

Here, with reference to FIGS. 14 and 15, an example of a quality management method for a filter device used in an intake passage of a large machine, specifically, a gas turbine will be described. FIG. 14 is a schematic cross-sectional configuration diagram of a filter unit 10 disposed in an intake passage 1 of a gas turbine. FIG. 15 is a plan view of one of filter layers 12 included in the filter unit 10 of FIG. 14 viewed from the upstream side of the intake passage 1.

The intake passage 1 is a duct connected to the intake side of the gas turbine and introduces gas taken from the outside into the gas turbine. The intake passage 1 is provided with a filter unit 10 as a filter device for removing foreign substances such as dust contained in the gas. The filter unit 10 includes a plurality of filter layers 12 arranged along the flow direction of intake gas, including a primary filter layer 12a, a secondary filter layer 12b, and a tertiary filter layer 12c in order from the upstream side.

As shown in FIG. 15, the intake passage 1 has an inner wall 1a defining a flow passage cross-section of substantially square shape. Each filter layer 12 included in the filter unit 10 has an outer shape corresponding to this cross-section, and the gas flowing through the intake passage 1 passes through each filter layer 12 and is supplied to the gas turbine on the downstream side.

Each filter layer 12 includes a plurality of filters 14 arranged along the cross-sectional direction of the intake passage 1. Each of the filters 14 includes a filter element accommodated in a housing, and is held by a frame 16 formed in a grid shape between inner walls 1a that face each other in a substantially vertical cross-section of the intake passage 1. The number of filters 14 included in each filter layer 12 depends on the specifications of the machine; it may reach up to several hundred in a large machine such as a gas turbine.

The filter life of the filter unit 10 with such a configuration can be evaluated by, for instance, measuring the differential pressure between the upstream space and the downstream space of each filter layer 12. FIG. 14 depicts a first differential pressure gauge 13a for measuring the differential pressure between the upstream space and the downstream space of the primary filter layer 12a, a second differential pressure gauge 13b for measuring the differential pressure between the upstream space and the downstream space of the secondary filter layer 12b, and a third differential pressure gauge 13c for measuring the differential pressure between the upstream space and the downstream space of the tertiary filter layer 12c. Detection values of these differential pressure gauges are input into a processing device (e.g., a control unit of gas turbine) composed of an electronic calculation device such as a computer, and are compared with a reference value corresponding to the usage limit to evaluate the filter life of each filter layer 12.

In this filter life evaluation method, however, since the method is performed based on the differential pressure between the upstream space and the downstream space of each filter layer 12, the performance is evaluated by each filter layer 12. Therefore, when a reduction in filter life is confirmed in a specific filter layer 12, it is necessary to replace all filters 14 of the confirmed filter layer 12. However, since each filter layer 12 includes hundreds of filters 14 as described above, the replacement requires a large number of workers. In addition, the replacement requires that the machine is stopped for a long time. Thus, the burden on the user is large both economically and work.

The burden on the user may be reduced by preferentially replacing the filter 14 in a region of the filter layer 12 where the amount of foreign substances contained in the intake gas is expected to be large, but in practice, it is not based on accurate quantitative evaluation.

When performance reduction is confirmed in a specific filter layer 12, the continued use as it may lead to a failure such as damage. Therefore, early countermeasures are required. However, preparing a large number of replacement filters 14 in advance imposes a heavy financial burden on the user. Especially when the filter 14 is a made-to-order product, a lead time of several months is required to prepare a large amount of replacements. For this reason, it is necessary to continuously monitor the filter life of each filter layer 12 and predict when the usage limit will be reached to prepare replacements in advance. However, since the tendency of the filter life to decrease is exponentially accelerated as the usage limit is approached, it is difficult to accurately predict it. Further, the filter 14 has individual differences in collection efficiency and capacity depending on the fiber diameter distribution and the basis weight of fibers constituting the filter element. Moreover, the large number of filters 14 include products manufactured in different lots. Such a situation is also a factor that cannot be ignored in evaluating the filter performance.

At least one embodiment of the present invention was made in view of the above, and an object thereof is to provide a filter unit quality management system and a filter unit quality management method that enable precise quality control by quantitatively evaluating the performance of each filter in a filter unit including a plurality of filters.

Solution to the Problems (1) To solve the above problem, at least one embodiment of the present invention provides a filter unit quality management system for managing quality of a filter unit that is disposed in an intake passage and includes at least one filter layer having a plurality of filters arranged along a cross-sectional direction of the intake passage, comprising: a plurality of evaluation parameter detection units each of which is disposed corresponding to each of at least part of the plurality of filters and configured to detect an evaluation parameter relating to a filter life time of the corresponding filter; and a quality evaluation unit configured to determine a distribution of the evaluation parameter in the plurality of filters based on detection values of the plurality of evaluation parameter detection units, and evaluate quality of the at least one filter layer based on the distribution.

With the above configuration (1), the evaluation parameter detection unit for detecting the evaluation parameter relating to the filter life time is provided for each of at least part of the plurality of filters included in the filter layer. The quality evaluation unit determines the distribution of the evaluation parameter in the plurality of filters based on the evaluation parameter detected in each filter, and evaluates the quality of the filter layer based on the distribution. Accordingly, when a reduction in filter life is detected in a specific filter layer, in which area of the filter layer the filter life has been reduced can be quantitatively evaluated based on each filter. Thus, it is possible to perform quality management at high precision.

(2) In some embodiments, in the above configuration (1), the quality evaluation unit evaluates degree of clogging of each of the plurality of filters based on a transient change in the evaluation parameter.

With the above configuration (2), the quality evaluation unit can evaluate the degree of clogging of each filter by monitoring a transient change in evaluation parameter in each filter.

(3) In some embodiments, in the above configuration (2), each of the plurality of filters has a filter element accommodated in a housing, and the evaluation parameter is filter differential pressure inside the housing.

With the above configuration (3), the degree of clogging of each filter can be evaluated by monitoring a transient change in differential pressure in each filter.

(4) In some embodiments, in the above configuration (3), the evaluation parameter is degree of strain of the housing.

With the above configuration (4), the degree of clogging of each filter can be evaluated by monitoring a transient change in degree of strain in each filter.

(5) In some embodiments, in any one of the above configurations (2) to (4), when there is a first filter in which the evaluation parameter temporarily increases, the quality evaluation unit evaluates that clogging has occurred in the first filter.

With the above configuration (5), in the clogged first filter, since the evaluation parameter temporarily increases due to a decrease in permeability of the intake gas, by detecting this behavior, the quality evaluation unit can determine the presence or absence of clogging.

(6) In some embodiments, in the above configuration (5), the quality evaluation unit verifies an evaluation result of the first filter, based on whether the evaluation parameter increases in a second filter adjacent to the first filter with a delay from the first filter.

With the above configuration (6), in the second filter adjacent to the first filter, since the evaluation parameter increases due to inflow of the intake gas that cannot pass through the clogged first filter, by detecting this behavior, the quality evaluation unit can verify the evaluation result of the first filter. Thus, it is possible to perform more reliable quality management.

(7) In some embodiments, in the above configuration (1), the quality evaluation unit evaluates degree of clogging of each of the plurality of filters based on an absolute value of the evaluation parameter.

With the above configuration (7), the degree of clogging of each filter can be evaluated by monitoring an absolute value of the evaluation parameter in each filter.

(8) In some embodiments, in the above configuration (7), the evaluation parameter is intake gas flow rate in the filters.

With the above configuration (8), the degree of clogging of each filter can be evaluated by monitoring an absolute value of the intake gas flow rate in each filter.

(9) In some embodiments, in the above configuration (7) or (8), when there is a first filter in which the evaluation parameter decreases, the quality evaluation unit evaluates that clogging has occurred in the first filter.

With the above configuration (9), in the clogged first filter, since the evaluation parameter decreases due to a decrease in permeability of the intake gas, by detecting this behavior, the quality evaluation unit can identify the clogged first filter.

(10) In some embodiments, in the above configuration (9), the quality evaluation unit verifies an evaluation result of the first filter, based on whether the evaluation parameter increases in a second filter adjacent to the first filter with a delay from the first filter.

With the above configuration (10), in the second filter adjacent to the first filter, since the evaluation parameter increases due to inflow of the intake gas that cannot pass through the clogged first filter, by detecting this behavior, the quality evaluation unit can verify the evaluation result of the first filter. Thus, it is possible to perform more reliable quality management.

(11) In some embodiments, in the above configuration (1), each of the plurality of filters has a filter element accommodated in a housing, the evaluation parameter includes filter differential pressure inside the housing and intake gas flow rate passing through the filters, and the quality evaluation unit evaluates degree of clogging of each of the plurality of filters based on flow resistance calculated from the differential pressure and the intake gas flow rate.

With the above configuration (11), the differential pressure and the intake gas flow rate are detected as the evaluation parameter in each filter. The quality evaluation unit calculates the flow resistance using the detected differential pressure and intake gas flow rate. Thus, it is possible to directly manage the filter life of each filter.

(12) In some embodiments, in any one of the above configurations (1) to (11), the evaluation parameter detection units are disposed in all the filters included in the at least one filter layer.

With the above configuration (12), since the evaluation parameter detection unit is provided for all the filters constituting the filter layer to be managed, it is possible to manage the quality of all the filters.

(13) In some embodiments, in any one of the above configurations (1) to (11), the evaluation parameter detection units are disposed in filters in a partial region of the at least one filter layer.

With the above configuration (13), the evaluation parameter detection unit is limitedly provided for a partial region of the plurality of filters constituting the filter layer to be managed. Thus, it is possible to effectively perform quality management while reducing the cost when all the filters are managed.

(14) In some embodiments, in any one of the above configurations (1) to (13), the at least one filter layer includes a plurality of filter layers arranged along the intake passage, and the evaluation parameter detection units are disposed in at least a most downstream filter layer of the plurality of filter layers.

With the above configuration (14), since the evaluation parameter detection unit is selectively provided for the downstream filter layer where the required performance for the filter is strict and the unit price tends to be expensive, it is possible to effectively perform quality management while reducing the cost.

(15) In some embodiments, in any one of the above configurations (1) to (14), the evaluation parameter detection units are connected to the quality evaluation unit wirelessly.

With the above configuration (15), even when the evaluation parameter detection unit is provided for a large number of filters, since each evaluation parameter detection unit is wirelessly connected to the quality evaluation unit, it is unnecessary to provide a communication cable or the like between the evaluation parameter detection unit and the quality evaluation unit. Thus, it is possible to save space. In addition, since the work of arranging the communication cable is not required, it is possible to improve the efficiency and prevent erroneous wiring.

(16) In some embodiments, in any one of the above configurations (1) to (15), the intake passage is connected to an intake port of a gas turbine.

With the above configuration (16), it is possible to suitably manage the quality of a filter unit applied to a gas turbine which is a large machine.

(17) To solve the above problem, at least one embodiment of the present invention provides a filter unit quality management method for managing quality of a filter unit that is disposed in an intake passage and includes at least one filter layer having a plurality of filters arranged along a cross-sectional direction of the intake passage, comprising: detecting an evaluation parameter relating to degree of clogging of each of at least part of the plurality of filters; determining a distribution of the evaluation parameter in the plurality of filters based on each of the detected evaluation parameters; and evaluating quality of the at least one filter layer based on the distribution.

The above method (17) can be suitably performed by the filter unit quality management system (including various embodiments) described above.

Advantageous Effects

At least one embodiment of the present invention provides a filter unit quality management system and a filter unit quality management method that enable precise quality control by quantitatively evaluating the performance of each filter in a filter unit including a plurality of filters.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

First Embodiment

Figure 1:
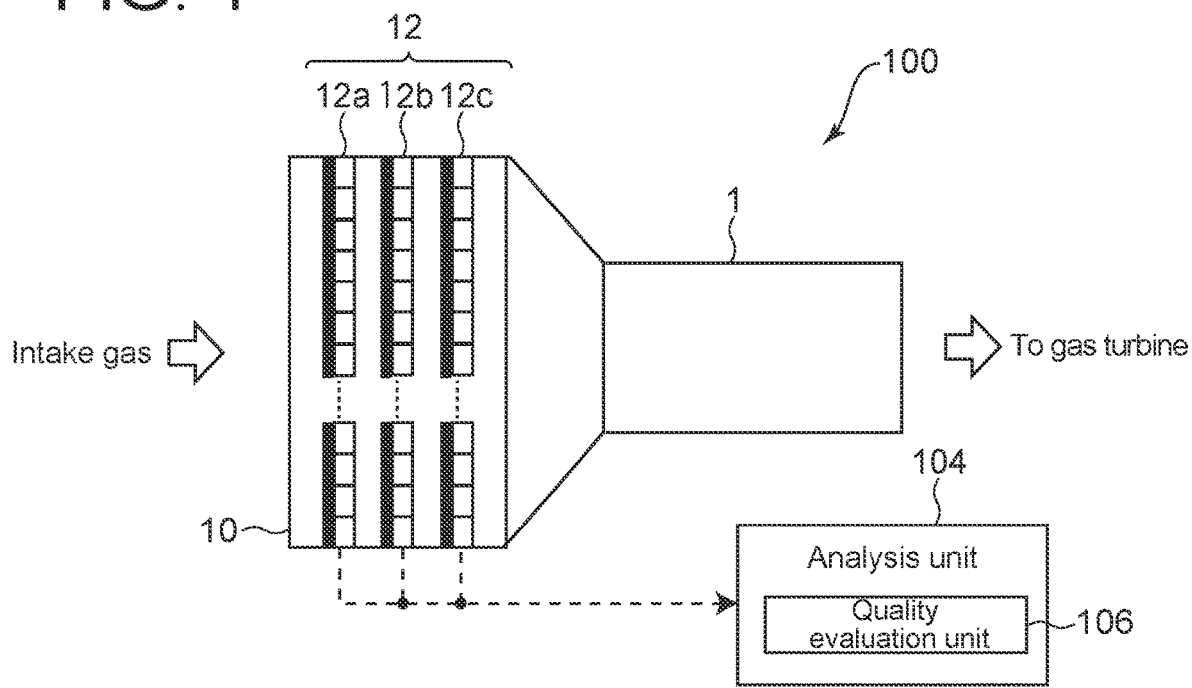
FIG. 1 is a schematic configuration diagram of a filter unit quality management system according to a first embodiment.
Figure 2:
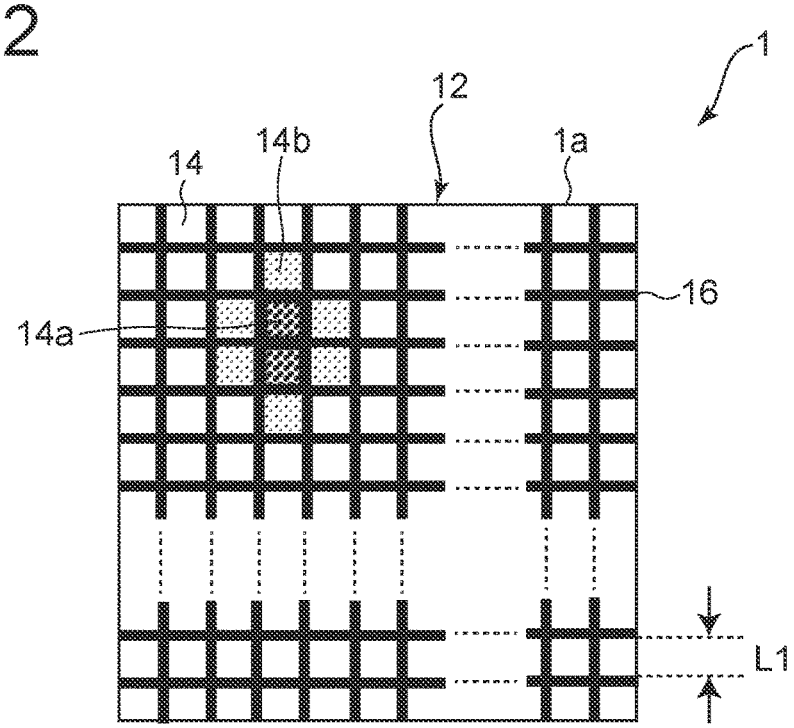
FIG. 2 is a plan view of one of filter layers included in the filter unit of FIG. 1 viewed from the upstream side of the intake passage.
Figure 3:
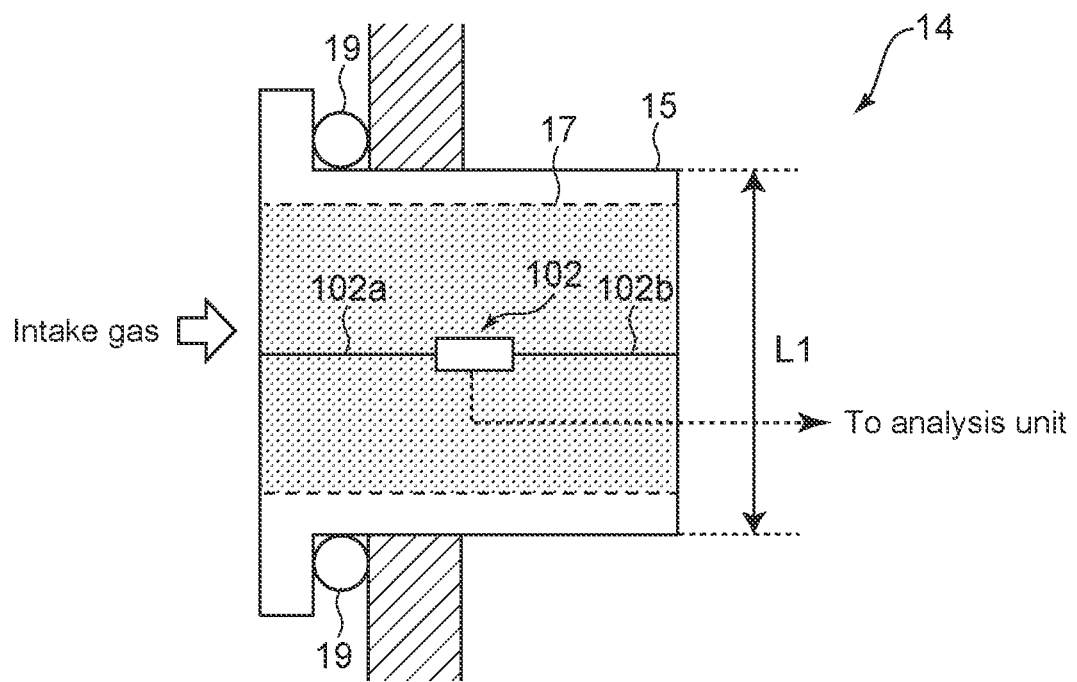
FIG. 3 is a cross-sectional configuration diagram of a filter included in a filter layer of the filter unit of FIG. 1.

FIG. 1 is a schematic configuration diagram of a filter unit quality management system 100 according to a first embodiment. FIG. 2 is a plan view of one of filter layers 12 included in the filter unit 10 of FIG. 1 viewed from the upstream side of the intake passage 1. FIG. 3 is a cross-sectional configuration diagram of a filter 14 included in a filter layer 12 of the filter unit 10 of FIG. 1.

As shown in FIG. 1, the intake passage 1 is a duct connected to the intake side of the gas turbine and introduces gas taken from the outside into the gas turbine. The intake passage 1 is provided with a filter unit 10 as a filter device for removing foreign substances such as dust contained in the gas. The filter unit 10 includes a plurality of filter layers 12 arranged along the flow direction of intake gas, including a primary filter layer 12a, a secondary filter layer 12b, and a tertiary filter layer 12c in order from the upstream side.

As shown in FIG. 2, the intake passage 1 has an inner wall 1a defining a flow passage cross-section of substantially square shape. Each filter layer 12 included in the filter unit 10 has an outer shape corresponding to the flow passage cross-section of the intake passage 1, and the gas flowing through the intake passage 1 passes through each filter layer 12 and is supplied to the gas turbine on the downstream side.

Each filter layer 12 includes a plurality of filters 14 arranged along the cross-sectional direction of the intake passage 1. As shown in FIG. 3, each of the filters 14 includes a filter element 17 accommodated in a housing 15, and is held in a matrix form by a frame 16 formed in a grid shape between inner walls 1a that face each other in a substantially vertical cross-section of the intake passage 1.

In a gap between the housing 15 and the frame 16, a packing 19 is disposed to prevent the leakage of gas through the gap.

The filter 14 in each filter layer 12 has a substantially square shape with one side L1 of, for example, about 600 mm. The depth of the primary filter layer 12a is 100 mm or less, and the depths of the secondary filter layer 12b and the tertiary filter layer 12c are 300 mm approximately. The number of filters 14 of each filter layer 12 depends on the cross-sectional area of the intake passage 1, for example, may be several hundreds.

The filter 14 constituting the primary filter layer 12a located most upstream in the filter unit 10 has a filter element 17 for collecting foreign substances having a relatively coarse particle size (e.g., 10 μm or more). The filter 14 constituting the secondary filter layer 12b located downstream of the primary filter 12a has a filter element 17 which is a medium efficiency filter for collecting foreign substances having a particle size smaller than the primary filter 12a (e.g., about 1 μm). The filter 14 constituting the tertiary filter layer 12c located downstream of the secondary filter 12b has a filter element 17 which is a HEPA filter for collecting foreign substances having a particle size smaller than the secondary filter 12b (e.g., submicron order). Thus, the gas taken into the filter unit 10 passes through the filter layers 12 to remove foreign substances, becomes clean, and is discharged downstream. Since a higher filter performance is required on the downstream side, generally, replacements of the filters 14 constituting the filter layer 12 on the downstream side tend to be expensive.

The quality of the filter unit 10 having this configuration is controlled by the filter unit quality management system 100. The filter unit quality management system 100 includes a differential pressure sensor 102 which is an evaluation parameter detection unit provided corresponding to the filter 14 of the filter layer 12, and an analysis unit 104 for performing analysis based on detection values of the differential pressure sensor 102. The differential pressure sensor 102 is disposed inside the housing 15 of each filter 14 as shown in FIG. 3, or on an outer surface of the housing 15. The differential pressure sensor 102 detects, as an evaluation parameter relating to the degree of clogging of the corresponding filter 14, the differential pressure of the filter 14 (as shown in FIG. 3, the differential pressure sensor 102 is configured to be able to detect differential pressure from a pressure acquired at a pressure outlet at the upstream end of the filter via a tube 102a and a pressure acquired at a pressure outlet at the downstream end of the filter via a tube 102b).

In the present embodiment, particularly, the differential pressure sensor 102 is connected to the analysis unit 104 by wireless communication. Thus, even when the differential pressure sensor 102 is provided for a large number of filters 14 constituting each filter layer 12, the space is not occupied by communication cables or the like.

The analysis unit 104 is composed of, for example, an electronic calculation device such as a computer, and acquires detection values of the differential pressure sensor 102 to evaluate the quality of the filter layer 12. The internal configuration of the analysis unit 104 includes a quality evaluation unit 106 for evaluating the quality of the filter layer 12 based on detection values of the differential pressure sensor 102, as shown as a functional block in FIG. 1. The analysis unit 104 is configured by reading a program for executing a quality evaluation method described below recorded on a predetermined recording medium into a computer, and installing the program, for instance.

The analysis unit 104 may be formed integrally with a control unit (not shown) of the gas turbine.

Figure 4:
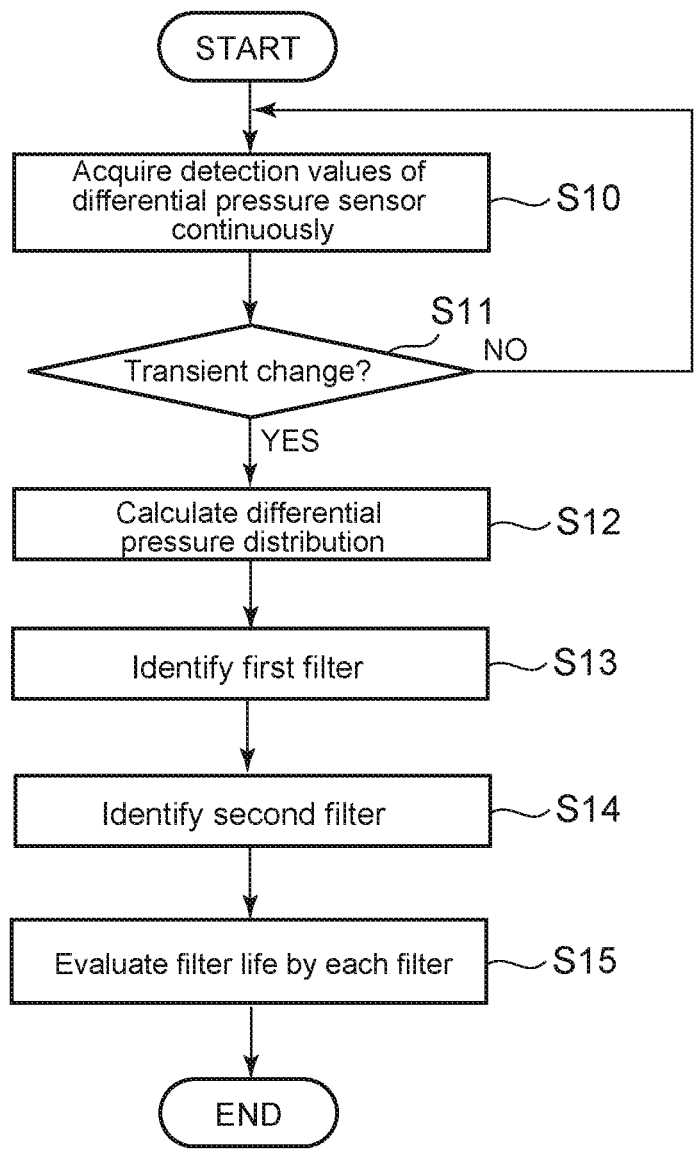
FIG. 4 is a flowchart showing steps of a quality evaluation method performed by the analysis unit of FIG. 1.

FIG. 4 is a flowchart showing steps of a quality evaluation method performed by the analysis unit 104 of FIG. 1. The analysis unit 104 continuously acquires detection values of the differential pressure sensor 102 disposed in the filter 14 of each filter layer 12 (step S10). Thus, the analysis unit 104 acquires temporal change in differential pressure of each filter 14 of each filter layer 12.

Then, the quality evaluation unit 106 determines whether there is a transient change in the temporal change in differential pressure detected by the filter 14, based on detection values of the differential pressure sensor acquired in step S10 (step S11). Whether there is a transient change is determined, for instance, by continuously monitoring detection values of the differential pressure sensor 102 and determining whether the change amount of differential pressure exceeds a reference value within a predetermined period.

Figure 5:
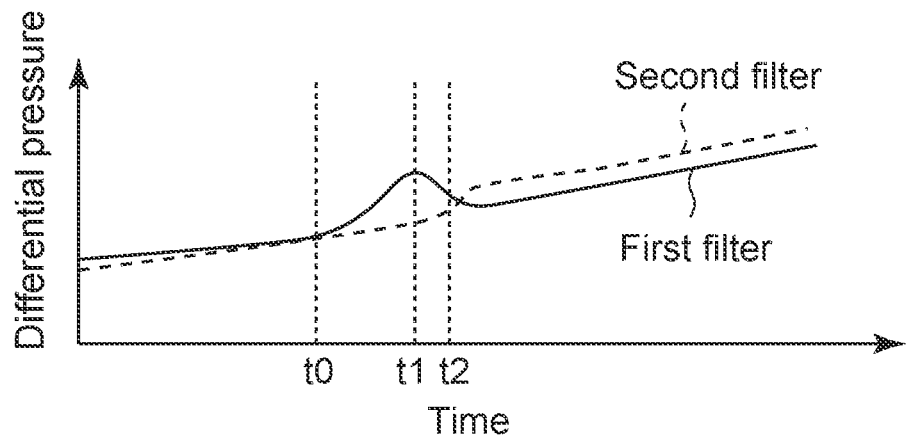
FIG. 5 is an example of temporal change of the differential pressure sensor acquired in step S10 of FIG. 4.

Then, if it is determined that there is a transient change (step S11: YES), the quality evaluation unit 106 determines a distribution of the differential pressure in the plurality of filters 14, based on the detection values of the differential pressure sensors 102 (step S12). FIG. 5 is an example of temporal change of the differential pressure sensor 102 acquired in step S10 of FIG. 4. Here, we consider the case where, among the plurality of filters 14 of each filter layer 12, a specific first filter 14a is clogged as shown in FIG. 2. In FIG. 5, the temporal change in differential pressure in the clogged first filter 14a is indicated by the solid line, and the temporal change in differential pressure in a second filter 14b adjacent to the first filter 14a is indicated by the dashed line.

In the first filter 14a, once clogging occurs at time t0, the flow resistance of the first filter 14a increases, so that the differential pressure temporarily increases. At this time, since the inflow amount to the filter 14a decreases due to the increase in flow resistance of the filter 14a, the temporarily increased differential pressure decreases after reaching maximum at time t1. On the other hand, in the second filter 14b adjacent to the first filter 14a, the gas that cannot pass through the first filter 14a is introduced, so that the differential pressure increases. Such an increase in differential pressure of the second filter 14b occurs at time t2 which is later than time t1.

In the following description, the temporal change in differential pressure corresponding to the clogged first filter 14a is referred to as pattern A, and the temporal change in differential pressure corresponding to the second filter 14b is referred to as pattern B.

As described above, when the first filter 14a is clogged, the flow resistance in the first filter 14a increases, so the flow rate of the first filter 14a decreases, and the flow rate allocation changes such that the differential pressure in each filter 14 is equalized. This influence extends to the adjacent second filter 14b, and thus the filter distribution changes. In step S12, the distribution is created by evaluating the temporal change in differential pressure in each filter 14 and mapping the first filter 14a or the second filter 14b where the transient change having the pattern A or B has occurred. FIG. 2 shows an example of the distribution thus created, in which the second filters 14 are disposed so as to surround the clogged first filters 14a.

Subsequently, the quality evaluation unit 106 identifies the clogged first filter 14a based on the distribution created in step S12 (step S13), and identifies the second filter 14b based on the distribution created in step S12 (step S14). Then, the filter life of each filter layer 12 is evaluated by each filter 14 based on the identification results of steps S13 and S14 (step S15). Thus, the quality evaluation unit 106 determines which filter 14 is clogged in each filter layer 12 having a large number of filters 14.

Although in the present embodiment, the first filter 14a and the second filter 14b can be identified from the distribution, when the second filter 14b cannot be identified, a region where clogging has occurred may be identified only by the first filter 14a. Conversely, when the first filter 14a cannot be identified, the distribution of the second filters 14b may be identified to indirectly identify the first filter 14a adjacent to the second filters 14b.

Further, although in the present embodiment, all filters 14 have the differential pressure sensor 102, when only part of the filters 14 has the differential pressure sensor 102, depending on the position of the filter 14 in which the differential pressure sensor 102 is disposed, it is possible that both the first filter 14a and the second filter 14b cannot be directly identified. However, even in this case, as described above, a region where clogging has occurred may be identified only by the first filter 14a, or the distribution of the second filters 14b may be identified to indirectly identify the first filter 14a adjacent to the second filters 14b.

The differential pressure sensor 102 for quality management of the filter unit 10 may be provided for all filter layers 12 (primary filter layer 12a, secondary filter layer 12b, and tertiary filter layer 12c) constituting the filter unit 10, or may be provided for part of the filter layers 12. In the latter case, preferably, the differential pressure sensor 102 may be disposed in at least the tertiary filter layer 12c on the most downstream side. In this case, since the downstream filter layer 12, which needs much cost for replacement, is selectively managed, it is possible to effectively perform quality management compared with the case where all filter layers 12 are managed. In addition, the tertiary filter layer 12c on the most downstream side is of high importance in the operation of the turbine to which the intake gas is supplied, and if this filter layer is damaged, it is likely to affect the operation of the turbine. It is thus preferred that the downstream filter layer 12 is preferentially managed.

In each filter layer 12, the differential pressure sensor 102 may be provided for all filters 14 constituting the filter layer 12. In this case, although the cost is high, the quality of all the filters 14 constituting the filter layer 12 can be controlled.

Alternatively, in each filter layer 12, the differential pressure sensor 102 may be limitedly arranged in filters 14 in a partial region among the filters 14 constituting the filter layer 12. In this case, the region where the differential pressure sensor 102 is arranged may be estimated as a region where clogging is likely to occur, from past data and experience. For example, the filter unit 10 is sometimes provided in an intake filter chamber of a multi-sided, multi-storey structure. In this case, soot and dust emitted from surrounding factories and trucks that frequently travel main roads will wind up on the area of turbine, so that the amount of dust and soot tends to increase at the side of the factories and the main roads. Moreover, the amount tends to increase in the lower floors due to the influence of gravity fall. By selecting the region where the differential pressure sensor 102 is arranged based on such a situation, the number of differential pressure sensors 102 can be suppressed, and effective management can be performed while reducing the cost.

Second Embodiment

Figure 6:
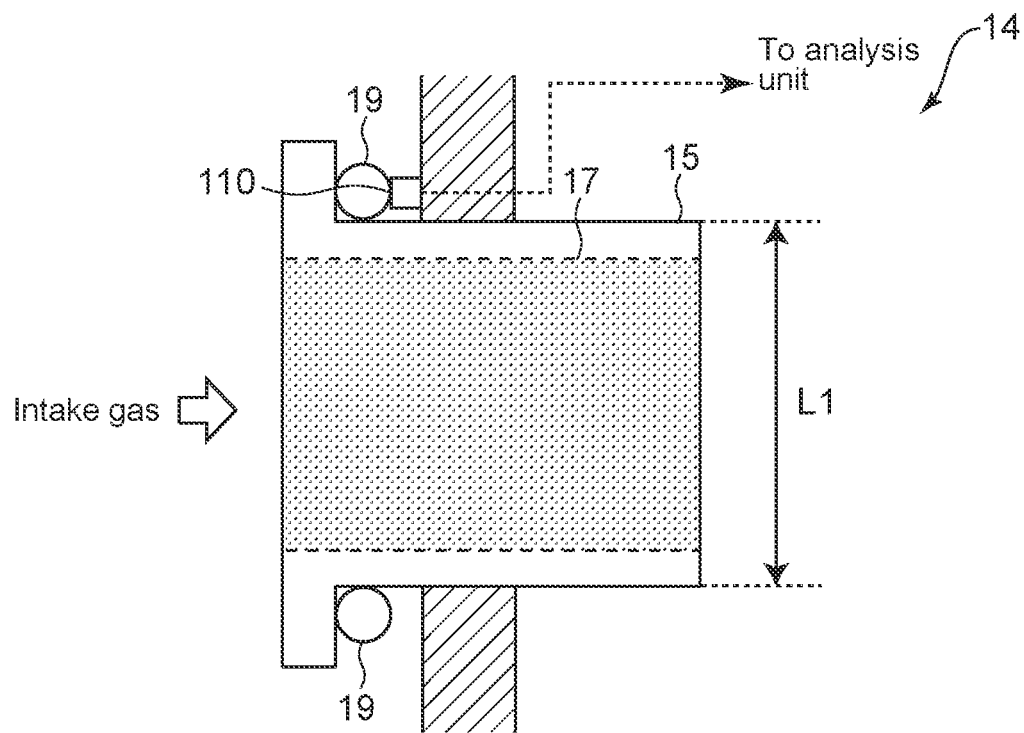
FIG. 6 is a cross-sectional configuration diagram of a filter according to a second embodiment.

FIG. 6 is a cross-sectional configuration diagram of the filter 14 according to a second embodiment. The configuration of the filter unit 10 according to the second embodiment is the same as that of the above-described embodiment unless otherwise specified, and corresponding components are designated by common reference numerals.

As shown in FIG. 6, the filter 14 according to the second embodiment is provided with, instead of the differential pressure sensor 102 according to the first embodiment, a strain sensor 110 for detecting the degree of strain of the housing 15 of the filter 14 held by the frame 16. The strain sensor 110 is disposed between the frame 16 and the housing 15 so as to be adjacent to the packing 19, and detects the degree of strain between the frame 16 and the housing 15.

The strain sensor 110 is connected to the analysis unit 104 by wireless communication. Thus, even when the strain sensor 110 is provided for a large number of filters 14 constituting each filter layer 12, the space is not occupied by communication cables or the like.

When the first filter 14a is clogged, the flow resistance of this filter 14 increases, so that the load received from the intake gas by the first filter 14 increases. This load changes strain between the frame 16 and the housing 15.

Figure 7:
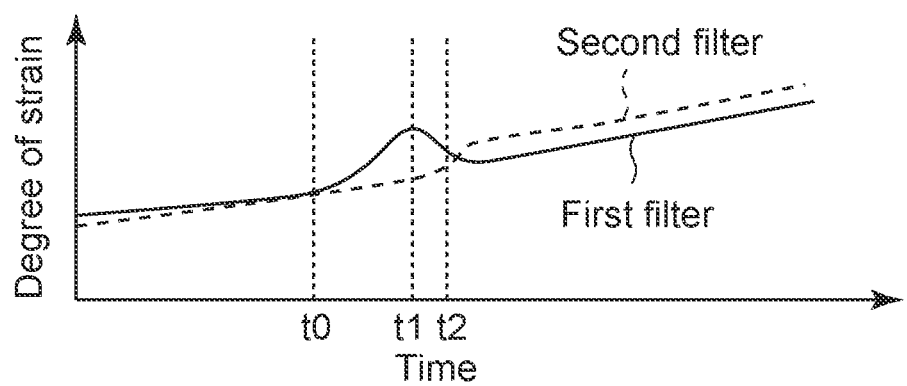
FIG. 7 is an example of temporal change in degree of strain detected by the strain sensor of FIG. 6.

FIG. 7 is an example of temporal change in degree of strain detected by the strain sensor 110 of FIG. 6. Here, as with the first embodiment, we consider the case where, among the plurality of filters 14 of each filter layer 12, a specific first filter 14a is clogged. In FIG. 7, the temporal change in degree of strain in the clogged first filter 14a is indicated by the solid line, and the temporal change in degree of strain in a second filter 14b adjacent to the first filter 14a is indicated by the dashed line. As is apparent from comparison between FIG. 5 and FIG. 7, the temporal change in degree of strain detected by the strain sensor 110 shows the same tendency as the temporal change in differential pressure detected by the differential pressure sensor 102 of the first embodiment.

Figure 8:
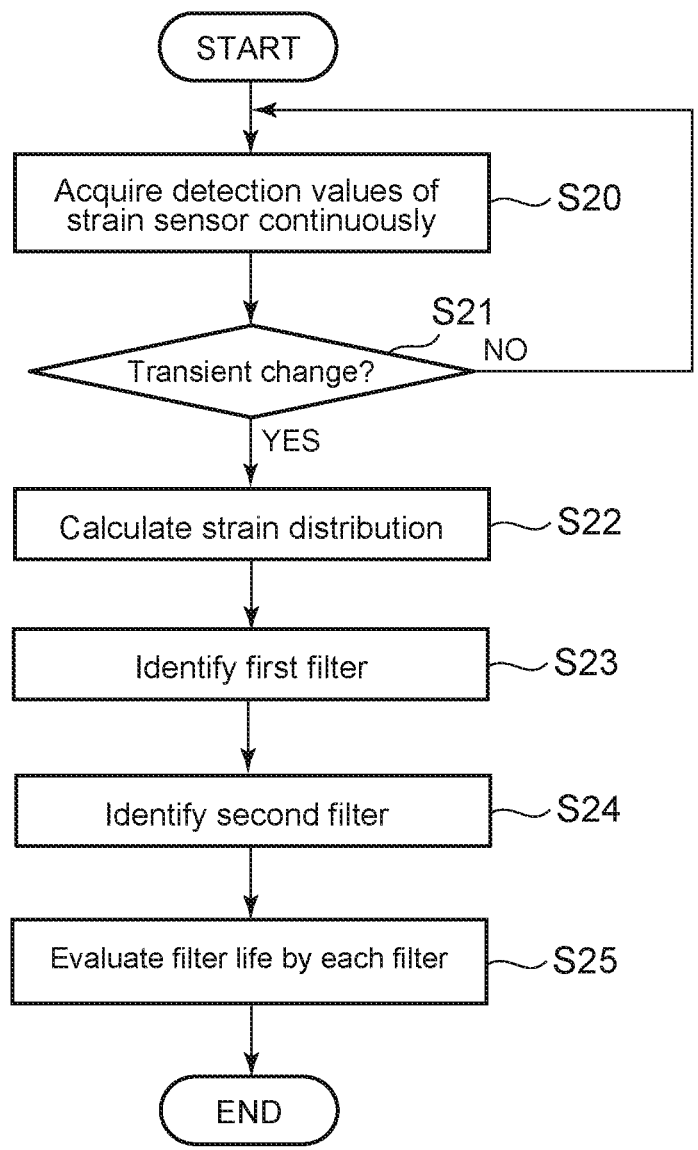
FIG. 8 is a flowchart showing steps of a filter unit management method according to the second embodiment.

FIG. 8 is a flowchart showing steps of a filter unit management method according to the second embodiment. As shown in steps of FIG. 8, by treating the transient change in degree of strain detected by the strain sensor 110 in the same manner as the transient change in differential pressure detected by the differential pressure sensor 102, it is possible to manage quality of the filters 14 of each filter layer 12.

Although the present embodiment shows the case where the detection target of the strain sensor 110 is strain caused by an increase in flow resistance of the filter 14 that collects foreign substances, the target may be strain caused by an increase in weight of the filter 14 that collects foreign substances. This case can also be treated in the same manner as described above.

Third Embodiment

Figure 9:
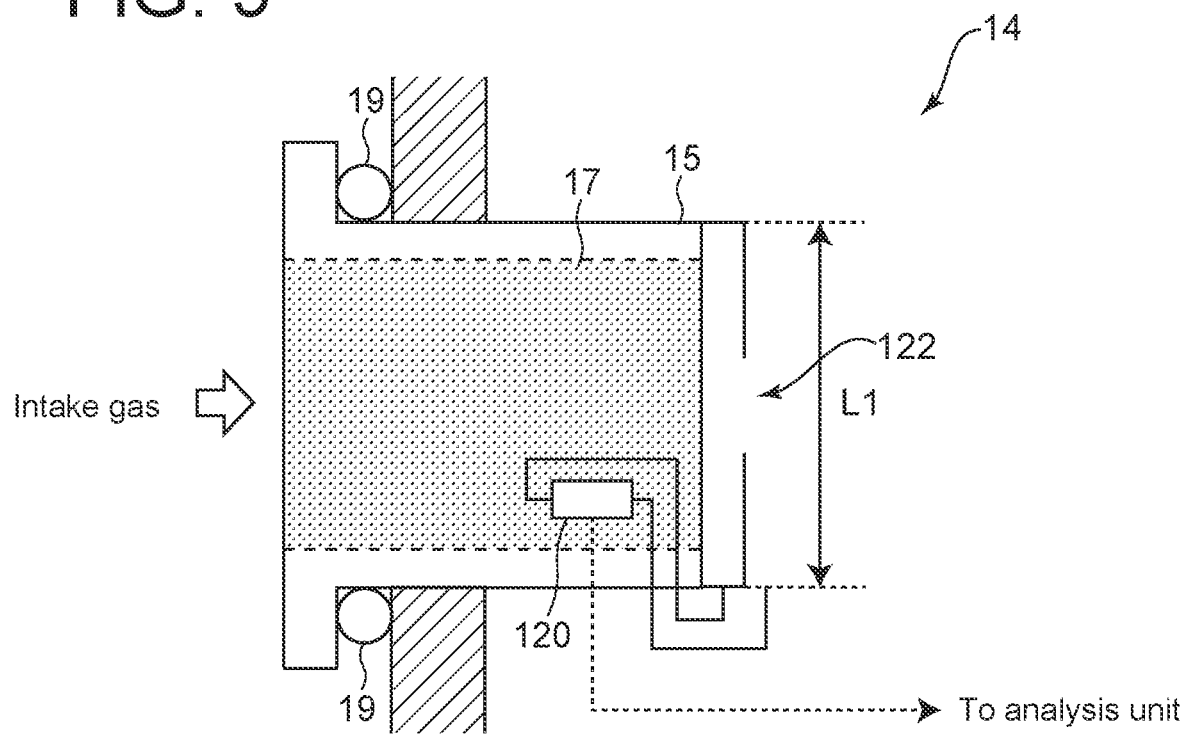
FIG. 9 is a cross-sectional configuration diagram of a filter according to a third embodiment.

FIG. 9 is a cross-sectional configuration diagram of the filter 14 according to a third embodiment. The configuration of the filter unit 10 according to the third embodiment is the same as that of the above-described embodiment unless otherwise specified, and corresponding components are designated by common reference numerals.

As shown in FIG. 9, the filter 14 according to the third embodiment is provided with, instead of the differential pressure sensor 102 according to the first embodiment, a differential pressure sensor 120 for detecting the intake gas flow rate of the filter 14. The differential pressure sensor 120 has an orifice 122 on the downstream side of the housing 15 of the filter 14, and is configured to be able to detect the flow rate of the gas passing through the filter 14, based on the differential pressure across the orifice 122.

The differential pressure sensor 120 is connected to the analysis unit 104 by wireless communication. Thus, even when the differential pressure sensor 120 is provided for a large number of filters 14 constituting each filter layer 12, the space is not occupied by communication cables or the like.

Figure 10:
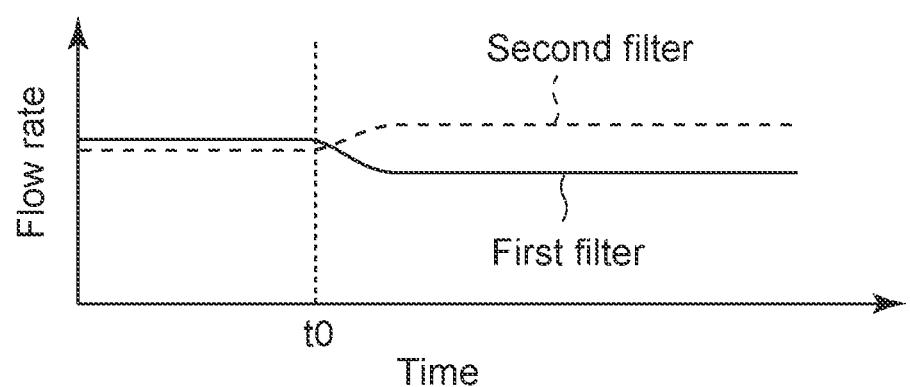
FIG. 10 is an example of temporal change in flow rate detected by the differential pressure sensor of FIG. 9.

FIG. 10 is an example of temporal change in flow rate detected by the differential pressure sensor 120 of FIG. 9. Here, as with the above-described embodiments, we consider the case where, among the plurality of filters 14 of each filter layer 12, a specific first filter 14a is clogged. In FIG. 10, the temporal change in flow rate in the clogged first filter 14a is indicated by the solid line, and the temporal change in flow rate in a second filter 14b adjacent to the first filter 14a is indicated by the dashed line.

In the first filter 14a, once clogging occurs at time t0, the intake gas flow rate of the first filter 14a decreases. The decrease in intake gas flow rate of the first filter 14a continues after time t0 unless the clogging of the first filter 14a is eliminated. On the other hand, in the second filter 14b adjacent to the first filter 14a, the gas that cannot pass through the first filter 14a is introduced, so that the intake gas flow rate increases. The increase in intake gas flow rate of the second filter 14b also continues after time t0 unless the clogging of the first filter 14a is eliminated.

In the third embodiment, the temporal change in intake gas flow rate corresponding to the clogged first filter 14a is referred to as pattern C, and the temporal change in intake gas flow rate corresponding to the second filter 14b is referred to as pattern D. The clogging of each filter 14 can be verified by evaluating whether the intake gas flow rate in each filter 14 is pattern C or D.

In particular, as previously described with reference to FIG. 10, since the increase or decrease in intake gas flow rate at time t0 continues even after time t0, by comparing a detection value of the differential pressure sensor 120 with a reference flow rate corresponding to the normal state, the clogging can be evaluated by an absolute value. In other words, while in the first and second embodiments, the clogging is evaluated based on a transient change, in the present embodiment, the clogging can be evaluated based on an absolute value, not the transient change.

Figure 11:
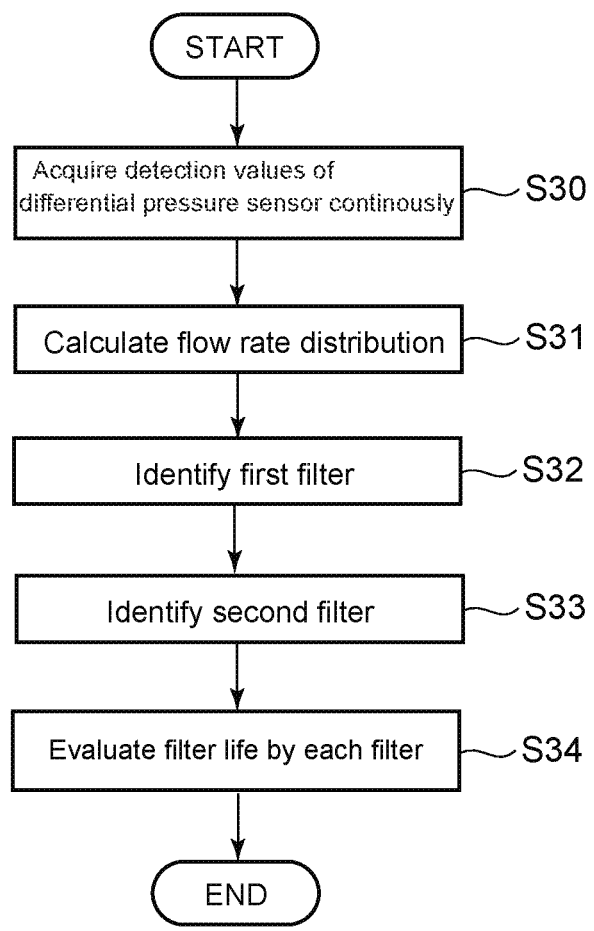
FIG. 11 is a flowchart showing steps of a filter unit management method according to the third embodiment.

FIG. 11 is a flowchart showing steps of a filter unit management method according to the third embodiment. The analysis unit 104 acquires detection values of the differential pressure sensor 120 disposed in the filter 14 of each filter layer 12 (step S30). Thus, the analysis unit 104 acquires the intake gas flow rate of each filter 14 constituting each filter layer 12.

Then, the quality evaluation unit 106 determines a distribution of the intake gas flow rate in the plurality of filters 14, based on the detection values of the differential pressure sensors 120 acquired in step S30 (step S31). Such a distribution of the intake gas flow rate is created by mapping the detection values of each differential pressure sensor 120 into pattern C or D.

Subsequently, the quality evaluation unit 106 identifies the clogged first filter 14a based on the distribution created in step S31 (step S32), and identifies the second filter 14b based on the distribution created in step S31 (step S33). Then, the filter life of each filter layer 12 is evaluated by each filter 14 based on the identification results of steps S32 and S33 (step S34). Thus, the quality evaluation unit 106 determines which filter 14 is clogged in each filter layer 12 having a large number of filters 14.

Fourth Embodiment

Figure 12:
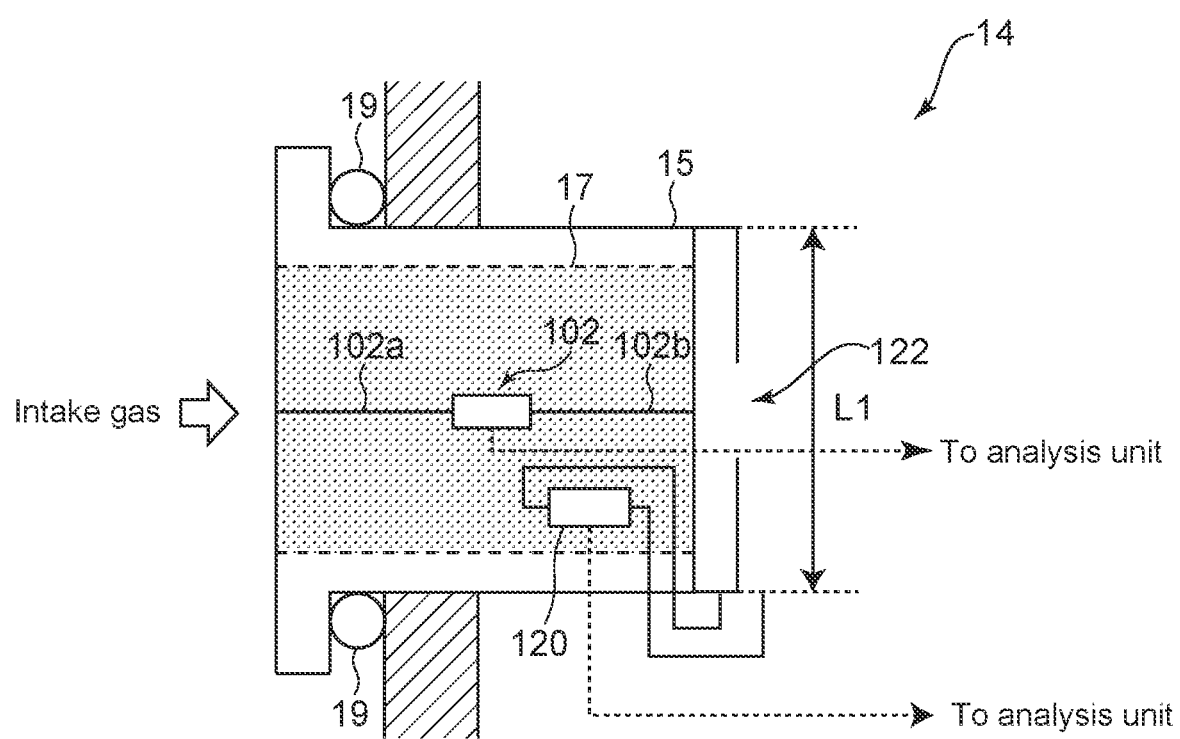
FIG. 12 is a cross-sectional configuration diagram of a filter according to a fourth embodiment.

FIG. 12 is a cross-sectional configuration diagram of the filter 14 according to a fourth embodiment. The configuration of the filter unit 10 according to the fourth embodiment is the same as that of the above-described embodiment unless otherwise specified, and corresponding components are designated by common reference numerals.

As shown in FIG. 12, the filter 14 according to the present embodiment includes both the differential pressure sensor 102 same as the first embodiment and the differential pressure sensor 120 same as the third embodiment. The analysis unit 104 acquires the differential pressure inside the housing 15 of each filter 14 using the differential pressure sensor 102, and acquires the flow rate of intake gas passing through each filter 14 using the differential pressure sensor 120 to calculate the flow resistance of each filter 14 based on the differential pressure and the flow rate. The flow resistance thus calculated is an evaluation parameter directly indicating the performance of each filter 14 and enables evaluation of the degree of clogging at high precision.

Figure 13:
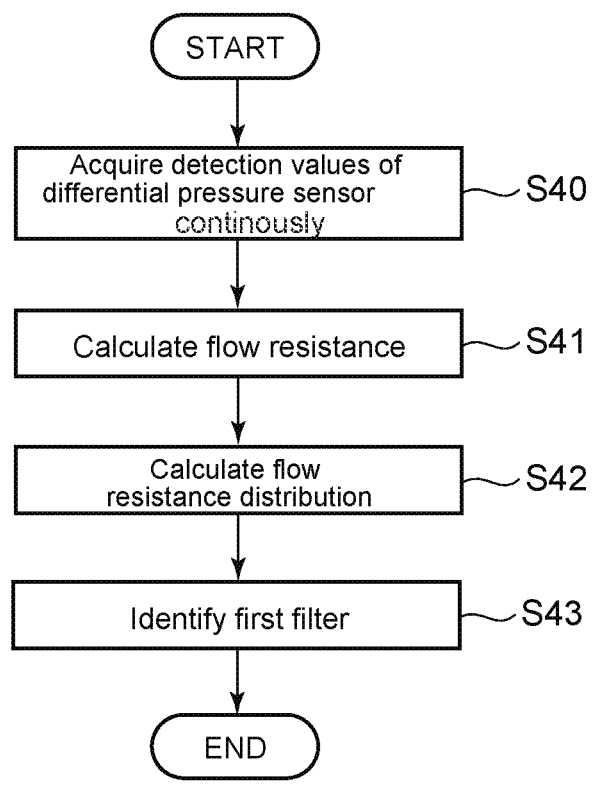
FIG. 13 is a flowchart showing steps of a filter unit management method according to the fourth embodiment.
Figure 14:
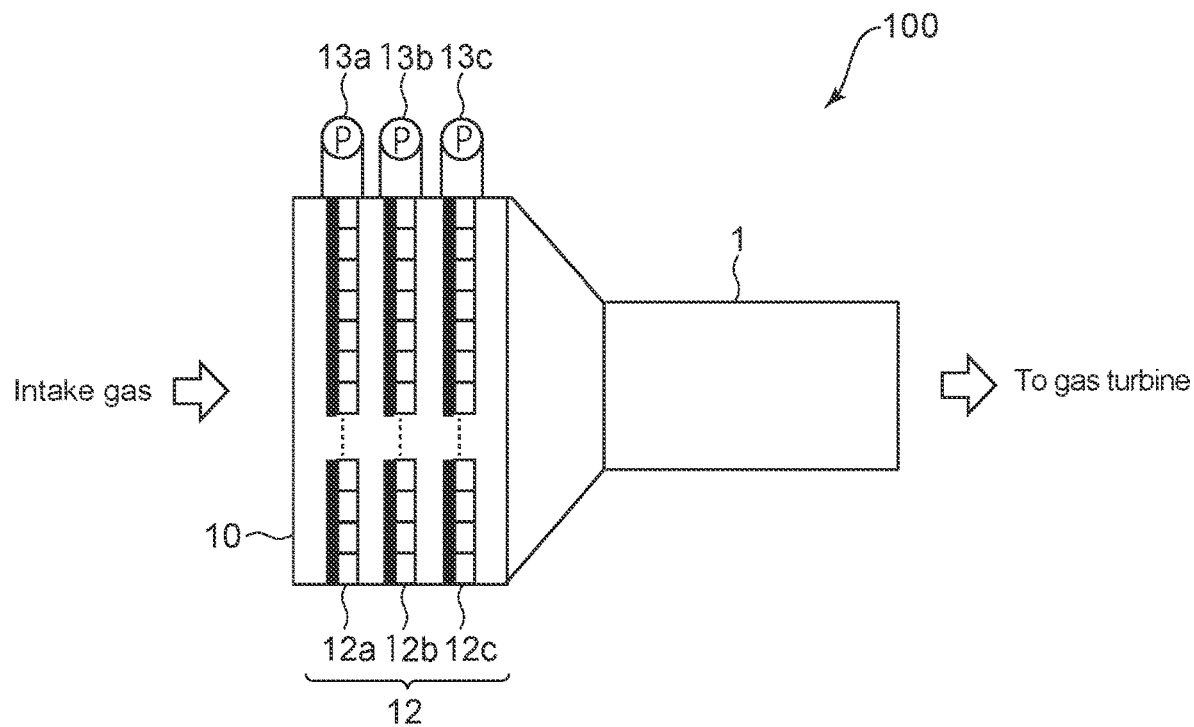
FIG. 14 is a schematic cross-sectional configuration diagram of a filter unit disposed in an intake passage of a gas turbine.
Figure 15:
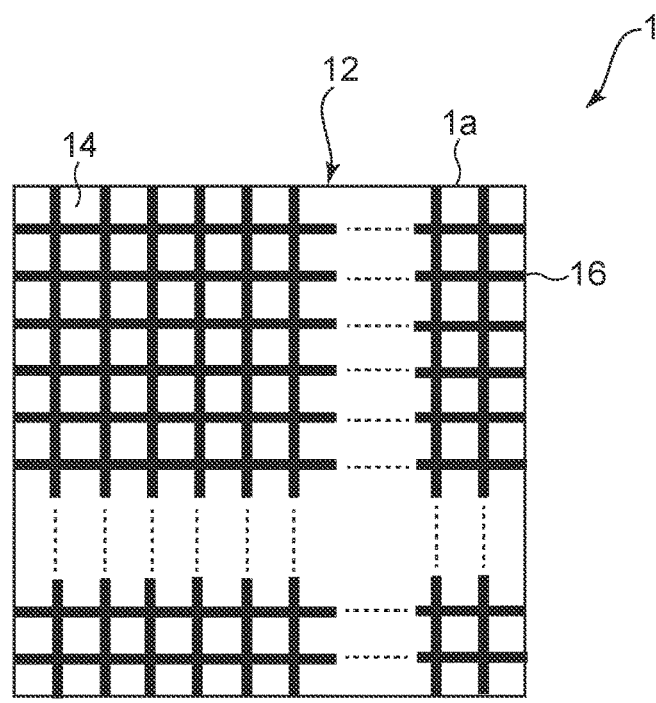
FIG. 15 is a plan view of one of filter layers included in the filter unit of FIG. 14 viewed from the upstream side of the intake passage.

FIG. 13 is a flowchart showing steps of a filter unit management method according to the fourth embodiment. The analysis unit 104 acquires detection values of the differential pressure sensor 102 and the differential pressure sensor 120 disposed in the filter 14 of each filter layer 12 (step S40). Thus, the analysis unit 104 acquires the differential pressure and the intake gas flow rate of each filter 14 constituting each filter layer 12.

Then, the quality evaluation unit 106 calculates the flow resistance of each filter 14 based on the detection values of the differential pressure sensor 102 and the differential pressure sensor 120 acquired in step S40 (step S41), and determines a distribution of the flow resistance in the plurality of filters 14 (step S42).

Subsequently, the quality evaluation unit 106 identifies the clogged first filter 14a based on the distribution created in step S42 (step S43). The identification of the first filter 14a is performed based on, for example, whether the flow resistance exceeds a reference value.

As described above, the above-described embodiments provide the filter unit quality management system and the unit quality management method that enable precise quality control by quantitatively evaluating the performance of each filter 14 in the filter unit 10 including the plurality of filters 14.

INDUSTRIAL APPLICABILITY

At least one embodiment of the present invention can be applied to a filter unit quality management system and a filter unit quality management method for quality management of a filter unit for removing foreign substances contained in intake gas flowing through an intake passage.

REFERENCE SIGNS LIST

1 Intake passage
1a Inner wall
10 Filter unit
12 Filter layer
14 Filter
15 Housing
16 Frame
17 Filter element
19 Packing
100 Filter unit quality management system
102 Differential pressure sensor
104 Analysis unit
106 Quality evaluation unit
110 Strain sensor
120 Differential pressure sensor
122 Orifice

The invention claimed is:

1. A filter unit quality management system for managing quality of a filter unit that is disposed in an intake passage and includes at least one filter layer having a plurality of filters arranged along a plane crossing an extending direction of the intake passage, the filter unit quality management system comprising:
   a plurality of evaluation parameter detection units each of which is disposed corresponding to each of at least part of the plurality of filters constituting one of the at least one filter layer, and configured to detect an evaluation parameter relating to a filter life time of the corresponding filter; and
   a quality evaluation unit configured to determine a distribution of the evaluation parameter in the plurality of filters based on detection values of the plurality of evaluation parameter detection units, and evaluate quality of the at least one filter layer based on the distribution,
   wherein the quality evaluation unit determines whether a first filter in which the evaluation parameter temporarily increases is clogged or not, based on whether the evaluation parameter increases in a second filter adjacent to the first filter with a delay from the first filter.

2. The filter unit quality management system according to claim 1, wherein the quality evaluation unit evaluates degree of clogging of each of the plurality of filters based on a transient change in the evaluation parameter.

3. The filter unit quality management system according to claim 2,
   wherein each of the plurality of filters has a filter element accommodated in a housing, and
   wherein the evaluation parameter is filter differential pressure inside the housing.

4. The filter unit quality management system according to claim 3, wherein the evaluation parameter is degree of strain of the housing.

5. A filter unit quality management system, for managing quality of a filter unit that is disposed in an intake passage and includes at least one filter layer having a plurality of filters arranged along a plane crossing an extending direction of the intake passage, the filter unit quality management system comprising:
   a plurality of evaluation parameter detection units each of which is disposed corresponding to each of at least part of the plurality of filters constituting one of the at least one filter layer,
   the evaluation parameter detection units being configured to detect an evaluation parameter relating to a filter life time of the corresponding filter; and
   a quality evaluation unit configured to determine a distribution of the evaluation parameter in the plurality of filters based on detection values of the plurality of evaluation parameter detection units, and evaluate quality of the at least one filter layer based on the distribution,
   wherein the quality evaluation unit verifies an evaluation result of the first filter, based on whether the evaluation parameter increases in a second filter adjacent to the first filter with a delay from the first filter.

6. The filter unit quality management system according to claim 1, wherein the quality evaluation unit evaluates degree of clogging of each of the plurality of filters based on an absolute value of the evaluation parameter.

7. The filter unit quality management system according to claim 6, wherein the evaluation parameter is intake gas flow rate in the filters.

8. The filter unit quality management system according to claim 6, wherein when there is a first filter in which the evaluation parameter decreases, the quality evaluation unit evaluates that clogging has occurred in the first filter.

9. The filter unit quality management system according to claim 8, wherein the quality evaluation unit verifies an evaluation result of the first filter, based on whether the evaluation parameter increases in a second filter adjacent to the first filter with a delay from the first filter.

10. The filter unit quality management system according to claim 1,
   wherein each of the plurality of filters has a filter element accommodated in a housing,
   wherein the evaluation parameter includes filter differential pressure inside the housing and intake gas flow rate passing through the filters, and
   wherein the quality evaluation unit evaluates degree of clogging of each of the plurality of filters based on flow resistance calculated from the differential pressure and the intake gas flow rate.

11. The filter unit quality management system according to claim 1, wherein the evaluation parameter detection units are disposed in all the filters included in the at least one filter layer.

12. The filter unit quality management system according to claim 1, wherein the evaluation parameter detection units are disposed in filters in a partial region of the at least one filter layer.

13. The filter unit quality management system according to claim 1,
wherein the at least one filter layer includes a plurality of filter layers arranged along the intake passage, and
wherein the evaluation parameter detection units are disposed in at least a most downstream filter layer of the plurality of filter layers.

14. The filter unit quality management system according to claim 1, wherein the evaluation parameter detection units are connected to the quality evaluation unit wirelessly.

15. The filter unit quality management system according to claim 1, wherein the intake passage is connected to an intake port of a gas turbine.

16. A filter unit quality management method for managing quality of a filter unit that is disposed in an intake passage and includes at least one filter layer having a plurality of filters arranged along a plane crossing an extending direction of the intake passage, the filter unit quality management method comprising:
detecting an evaluation parameter relating to degree of clogging of each of at least part of the plurality of filters constituting one of the at least one filter layer;
determining a distribution of the evaluation parameter in the plurality of filters based on each of the detected evaluation parameters; and
evaluating quality of the at least one filter layer based on the distribution,
wherein the quality evaluation unit determines whether a first filter in which the evaluation parameter temporarily increases is clogged or not, based on whether the evaluation parameter increases in a second filter adjacent to the first filter with a delay from the first filter.

* * * * *